US008705856B2

(12) United States Patent
Kang

(10) Patent No.: US 8,705,856 B2
(45) Date of Patent: Apr. 22, 2014

(54) METHOD AND APPARATUS FOR COLOR CONVERSION BASED ON LCH COLOR SPACE, AND LIQUID CRYSTAL DISPLAY DEVICE

(75) Inventor: Chih-tsung Kang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 195 days.

(21) Appl. No.: 13/513,293

(22) PCT Filed: Apr. 12, 2012

(86) PCT No.: PCT/CN2012/073865
§ 371 (c)(1), (2), (4) Date: Jun. 1, 2012

(87) PCT Pub. No.: WO2013/143171
PCT Pub. Date: Oct. 3, 2013

(65) Prior Publication Data

US 2013/0257889 A1 Oct. 3, 2013

(30) Foreign Application Priority Data

Mar. 31, 2012 (CN) .......................... 2012 1 0092866

(51) Int. Cl.
*G06K 9/00* (2006.01)

(52) U.S. Cl.
USPC ........................................... 382/167; 358/1.9

(58) Field of Classification Search
USPC .................................... 382/162, 167; 358/1.9
See application file for complete search history.

(56) References Cited

U.S. PATENT DOCUMENTS

| | | | | |
|---|---|---|---|---|
| 5,692,071 | A * | 11/1997 | Govaert | 382/167 |
| 6,058,208 | A * | 5/2000 | Ikeda et al. | 382/167 |
| 7,231,084 | B2 * | 6/2007 | Tang et al. | 382/162 |
| 7,586,642 | B2 * | 9/2009 | Chiba | 358/1.9 |
| 7,605,945 | B2 * | 10/2009 | Kondo | 358/1.9 |
| 2003/0179212 | A1 * | 9/2003 | Matsushiro et al. | 345/597 |
| 2004/0126009 | A1 * | 7/2004 | Takenaka et al. | 382/162 |

* cited by examiner

*Primary Examiner* — Samir Ahmed
(74) *Attorney, Agent, or Firm* — Andrew C. Cheng

(57) ABSTRACT

The present invention discloses a method and apparatus for color conversion based on LCH color space. The method includes: converting source plane Hn, Hn−1 to target plane Hn', Hn−1'; computing Hx between Hn and Hn−1; computing Hx' between Hn' and Hn−1' and at the same hue level as t Hx; computing conversion matrix Hn and Hn'; computing target color converted from color of any point of Hx and completing space color of target color. Through this method, it is possible to make the color performance closer to the actual object color or closer to expected effect than the actual object color.

17 Claims, 5 Drawing Sheets

METHOD AND APPARATUS FOR COLOR CONVERSION BASED ON LCH COLOR SPACE, AND LIQUID CRYSTAL DISPLAY DEVICE

BACKGROUND OF THE INVENTION

1. Field of the Invention

The present invention relates to the field of color conversion, and in particular to a method and apparatus for color conversion based on LCH color space and liquid crystal display device.

2. The Related Arts

Essentially, liquid crystal display (LCD) devices have the color dispersion problem. In addition, the use of photo-resistors and light sources will make the color performance on LCD very different from what human eyes experience in reality.

Based on physics and photometry, an appropriate combination of three base colors can be used to describe all the colors available in the nature. A color notation system based on this theory is called a color mixing system. The most important mixing color systems for color notation are the Commission International d'Eclairage (CIE) systems, such as, CIE XYZ, CIE Lab, CIE LUV and CIE LCH.

Color conversion is a technique to convert a color from one color space to another color space. There are many techniques to realize the color space conversion, such as, model method, neural network algorithm, and so on, wherein model method involves complicated computation process to find solutions and the conversion result is not always satisfactory, while the neural network algorithm approach requires a large amount of experiments, with each experiment requiring a long time. Furthermore, the above two approaches for color conversion also result in a large discrepancy between the LCD color performance and the actual color of an object.

Therefore, it is imperative to develop color conversion techniques to make the color performance of the LCD closer to, or even brighter and more vivid than, the actual color of the object.

SUMMARY OF THE INVENTION

The technical issue to be addressed by the present invention is to provide a method and apparatus for color conversion based on LCH color space and a liquid crystal display device, which is easier to construct a reverse conversion model, and implement the conversion algorithm with fast computation so that the color performance can be closer to the actual object color or closer to expected effect than the actual object color.

An exemplary embodiment of the present invention provides a method for color conversion based on LCH color space, including the following steps:

inputting source graphic data based on LCH three-dimensional color space;

dividing the color space having all the colors corresponding to source graphic data into n two-dimensional color spaces, H1, H2, H3, . . . , Hn−1 and Hn, respectively, where n being a natural number;

defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where An', Bn', Cn', Dn', . . . , and An, Bn, Cn, Dn, having a first-type one-to-one mapping relation;

based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', . . . , of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn';

based on the first-type one-to-one mapping relation, determining a second-type one-to-one mapping relation between the most saturated peripheral specific points An−1', Bn−1', Cn−1', Dn−1', . . . , in target two-dimensional color space Hn−1' and the most saturated peripheral specific points An−1, Bn−1, Cn−1, Dn−1, . . . , in two-dimensional color space Hn−1 having source graphic data; based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1';

based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where Ax=($C_{Ax}$, $L_{Ax}$), Bx=($C_{Bx}$, $L_{Bx}$), Cx=($C_{Cx}$, $L_{Cx}$), Dx=($C_{Dx}$, $L_{Dx}$), . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where Ax'=($C_{Ax}$', $L_{Ax}$'), Bx'=($C_{Bx}$', $L_{Bx}$'), Cx'=($C_{Cx}$', $L_{Cx}$'), Dx'=($C_{Dx}$', $L_{Dx}$'), . . . ;

based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color (C*, L*) in two-dimensional color space Hx and the two-dimensional color (C*', L*') in the target two-dimensional color space Hx';

through the third conversion matrix, computing the target color converted from the color of any point of source graphic data in the two-dimensional color space Hx; and outputting or preserving the bull's eye chart data corresponding to the target color after the above color conversion;

wherein the first conversion matrix being expressed as:

$$\begin{bmatrix} C_{n^*} \\ L_{n^*} \end{bmatrix} =$$

-continued $$\begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_n^3 \\ L_n^3 \\ C_n^2 L_n \\ C_n L_n^2 \\ C_n^2 \\ L_n^2 \\ C_n L_n \\ C_n \\ L_n \\ 1 \end{bmatrix}$$

wherein the second conversion matrix being expressed as:

$$\begin{bmatrix} C_{n-1^*} \\ L_{n-1^*} \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} C_{n-1}^3 \\ L_{n-1}^3 \\ C_{n-1}^2 L_{n-1} \\ C_{n-1} L_{n-1}^2 \\ C_{n-1}^2 \\ L_{n-1}^2 \\ C_{n-1} L_{n-1} \\ C_{n-1} \\ L_{n-1} \\ 1 \end{bmatrix}$$

wherein the step of computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, where Ax=(CAx, LAx), Bx=(CBx, LBx), Cx=(CCx, LCx), Dx=(CDx, LDx), . . . , further including: based on the first equation among the most saturated peripheral specific points Ax, Bx, Cx, Dx, . . . , of two-dimensional color space Hx, the most saturated peripheral specific points An, Bn, Cn, Dn, . . . , of two-dimensional color space Hn and the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where the first equation being:

$$C_x = C_n + (H_x - H_n) * (C_{n-1} - C_n) / (H_{n-1} - H_n)$$

$$L_x = L_n + (H_x - H_n) * (L_{n-1} - L_n) / (H_{n-1} - H_n)$$

wherein the step of computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', where Ax'=(CAx', LAx'), Bx'=(CBx', LBx'), Cx'=(CCx', LCx'), Dx'=(CDx', LDx'), . . . , further including: based on the second equation among the most saturated peripheral specific points Ax', Bx', Cx', Dx', . . . , of two-dimensional color space Hx', the most saturated peripheral specific points An', Bn', Cn', Dn', . . . , of two-dimensional color space Hn' and the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where the second equation being:

$$C_x' = C_n' + (H_x' - H_n') * (C_{n-1}' - C_n') / (H_{n-1}' - H_n')$$

$$L_x' = L_n' + (H_x' - H_n') * (L_{n-1}' - L_n') / (H_{n-1}' - H_n')$$

wherein the computed third conversion matrix between the two-dimensional color (C*, L*) in two-dimensional color space Hx and the two-dimensional color (C*', L*') in the target two-dimensional color space Hx';

$$\begin{bmatrix} C_x' \\ L_x' \end{bmatrix} = \begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_x^3 \\ L_x^3 \\ C_x^2 L_x \\ C_x L_x^2 \\ C_x^2 \\ L_x^2 \\ C_x L_x \\ C_x \\ L_x \\ 1 \end{bmatrix}$$

wherein after the step of, through the third conversion matrix, computing the target color converted from the color of any point of source graphic data in the two-dimensional color space Hx, the following step being performed: based on different preference, adjusting the hue of the target color for different hue; the adjustment equation is: H'=H+Δf(H), where H being the source hue plane, H' being the adjusted hue performance according to preference, Δf(H) representing the hue adjustment extent on the source hue plane;

wherein before the step of: dividing the color space having all the colors corresponding to source graphic data into n two-dimensional color spaces, the following step being performed: based on the positive proportional relation between the precision of color conversion and the number of the color space division, determining the number n to divide the color space having all colors corresponding to source graphic data into n two-dimensional color spaces having equal hue parts;

wherein before the step of: defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , the following step being performed: based on the positive proportional relation between the precision of color conversion and the number of the most saturated peripheral specific points of two-dimensional color space, determining the number of the most saturated peripheral specific points of two-dimensional color space.

Another exemplary embodiment of the present invention provides an apparatus for color conversion based on LCH color space, including the following modules:

a source data registration module, inputting source graphic data based on LCH three-dimensional color space;

a division module, for dividing the color space having all the colors corresponding to source graphic data into n two-dimensional color spaces, H1, H2, H3, . . . , Hn−1 and Hn, respectively, where n being a natural number;

a first mapping relation module, for defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where the most saturated peripheral specific points An', Bn', Cn', Dn', . . . , of two-dimensional color space Hn' and the most saturated peripheral specific points An, Bn, Cn, Dn, . . . , of two-dimensional color space Hn having a first-type one-to-one mapping relation;

a first conversion matrix module, for executing the following computation: based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', . . . , of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn';

a second mapping relation module, for executing the following computation: based on the first-type one-to-one mapping relation, determining a second-type one-to-one mapping relation between the most saturated peripheral specific points An−1', Bn−1', Cn−1', Dn−1', . . . , in target two-dimensional color space Hn−1' and the most saturated peripheral specific points An−1, Bn−1, Cn−1, Dn−1, . . . , in two-dimensional color space Hn−1 having source graphic data;

a second conversion matrix module, for executing the following computation: based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1';

a computation module, for executing the following computation: based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, of two-dimensional color space Hx at any hue level between two-dimensional color space Hn and two-dimensional color space Hn−1, where Ax=(CAx, LAx), Bx=(CBx, LBx), Cx=(CCx, LCx), Dx=(CDx, LDx), . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where Ax'=(CAx', LAx'), Bx'=(CBx', LBx'), Cx'=(CCx', LCx'), Dx'=(CDx', LDx'), . . . ;

a third conversion matrix module, for executing the following computation: based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color (C*, L*) in two-dimensional color space Hx and the two-dimensional color (C*', L*') in the target two-dimensional color space Hx';

a target space color module, for executing the following computation: through the third conversion matrix, computing the target color converted from the color of any point of source graphic data in the two-dimensional color space Hx; and a target data outputting module, for outputting or preserving the bull's eye chart data corresponding to the target color after the above color conversion;

wherein the apparatus further including a hue adjustment module, for executing the following computation: based on different preference, adjusting the hue of the target color for different hue; the adjustment equation is: $H'=H+\Delta f(H)$, where H being the source hue plane, H' being the adjusted hue performance according to preference, $\Delta f(H)$ representing the hue adjustment extent on the source hue plane;

wherein the apparatus further including a division number determination module, for executing the following computation: based on the positive proportional relation between the precision of color conversion and the number of the color space division, determining the number n to divide the color space having all colors corresponding to source graphic data into n two-dimensional color spaces having equal hue parts;

wherein the apparatus further including a specific point number determination module, for executing the following computation: based on the positive proportional relation between the precision of color conversion and the number of the most saturated peripheral specific points of two-dimensional color space, determining the number of the most saturated peripheral specific points of two-dimensional color space.

Yet another exemplary embodiment of the present invention provides a liquid crystal display device, including the following modules:

a source data registration module, inputting source graphic data based on LCH three-dimensional color space;

a division module, for dividing the color space having all the colors corresponding to source graphic data into n two-dimensional color spaces, H1, H2, H3, Hn−1 and Hn, respectively, where n being a natural number;

a first mapping relation module, for defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where the most saturated peripheral specific points An', Bn', Cn', Dn', . . . , of two-dimensional color space Hn' and the most saturated peripheral specific points An, Bn, Cn, Dn, . . . , of two-dimensional color space Hn having a first-type one-to-one mapping relation;

a first conversion matrix module, for executing the following computation: based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', . . . , of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn';

a second mapping relation module, for executing the following computation: based on the first-type one-to-one mapping relation, determining a second-type one-to-one mapping relation between the most saturated peripheral specific points An−1', Bn−1', Cn−1', Dn−1', . . . , in target two-dimensional color space Hn−1' and the most saturated peripheral specific points An−1, Bn−1, Cn−1, Dn−1, . . . , in two-dimensional color space Hn−1 having source graphic data;

a second conversion matrix module, for executing the following computation: based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1';

a computation module, for executing the following computation: based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, of two-dimensional color space Hx at any hue level between two-dimensional Color space Hn and two-dimensional color space Hn−1, where Ax=(CAx, LAx), Bx=(CBx, LBx), Cx=(CCx, LCx), Dx=(CDx, LDx), . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where Ax'=(CAx', LAx'), Bx'=(CBx', LBx'), Cx'=(CCx', LCx'), Dx'=(CDx', LDx'), . . . ;

a third conversion matrix module, for executing the following computation: based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color (C*, L*) in two-dimensional color space Hx and the two-dimensional color (C*', L*') in the target two-dimensional color space Hx';

a target space color module, for executing the following computation: through the third conversion matrix, computing the target color converted from the color of any point of source graphic data in the two-dimensional color space Hx; and a target data outputting module, for outputting or preserving the bull's eye chart data corresponding to the target color after the above color conversion; and a display module, for displaying the bull's eye chart data corresponding to t the target color after the above color conversion;

wherein the apparatus further including a hue adjustment module, for executing the following computation: based on different preference, adjusting the hue of the target color for different hue; the adjustment equation is: $H'=H+\Delta f(H)$, where H being the source hue plane, H' being the adjusted hue performance according to preference, $\Delta f(H)$ representing the hue adjustment extent on the source hue plane;

wherein the apparatus further including a division number determination module, for executing the following computation: based oh the positive proportional relation between the precision of color conversion and the number of the color space division, determining the number n to divide the color space having all colors corresponding to source graphic data into n two-dimensional color spaces having equal hue parts;

wherein the apparatus further including a specific point number determination module, for executing the following computation: based on the positive proportional relation between the precision of color conversion and the number of the most saturated peripheral specific points of two-dimensional color space, determining the number of the most saturated peripheral specific points of two-dimensional color space.

The efficacy of the present invention is to be distinguished from the state of the art in the color conversion and liquid crystal display device technologies. The present invention converts source graphic data in two-dimensional color space Hn and two-dimensional color Hn−1 to target two-dimensional color space Hn' and two-dimensional color space Hn−1' through conversion matrix; uses two-dimensional color space Hn and two-dimensional color Hn−1 to compute a two-dimensional color space Hx between two-dimensional color space Hn and two-dimensional color Hn−1; uses two-dimensional color space Hn' and two-dimensional color Hn−1' to compute a two-dimensional color space Hx' between two-dimensional color space. Hn' and two-dimensional color Hn−1' and at the same hue level as two-dimensional color space Hx; uses two-dimensional color space Hn and two-dimensional color Hn' to compute the conversion matrix between two-dimensional color space Hn and two-dimensional color Hn'; uses the conversion matrix between two-dimensional color space Hn and two-dimensional color Hn' to compute the target color converted from the color of any point of source graphic data and complete the color space of the target color. Through this manner, it is possible to perform color conversion on color signals in the LCH color space, adjust the color performance of the output color in hue and color purity, and enhance or accentuate any specific colors.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following detailed description refers to the Figures and the embodiments of the present invention.

Figure 1:
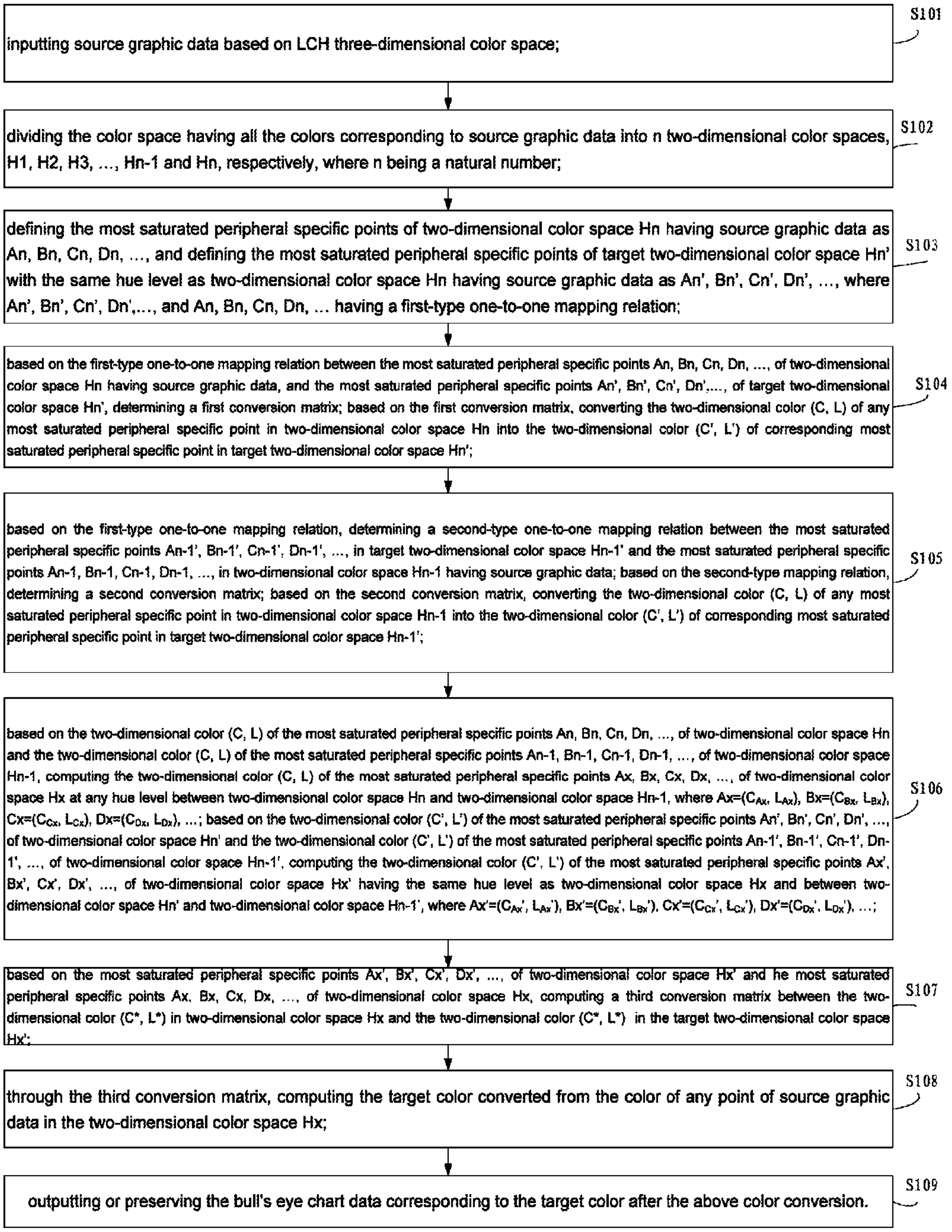
FIG. 1 is a schematic view showing the flowchart of an embodiment of color conversion method based on LCH color space according to the present invention.

FIG. 1 is a schematic view the flowchart of an embodiment of color conversion method based on LCH color space according to the present invention. As shown in FIG. 1, the method includes the following steps:

Step S101: inputting source graphic data based on LCH three-dimensional color space;

LCH color space is derived from CIE LAB color space. LCH color space uses lightness L, chorma (saturation) C and hue H to describe color. The user can caliber the color from the lightness, chroma and hue of the color according to the visual psychology. LCH color space can use a three-dimensional column structure to represent the three basic attributed of the color: hue H, lightness L and chroma (saturation) C. Chroma C ranges from 0 to 100, lightness L ranges from absolute black 0 to reference white 100, and hue H is expressed in degrees and ranges from 0° to 360°.

Step S102: dividing the color space having all the colors corresponding to source graphic data into n two-dimensional color spaces, H1, H2, H3, . . . , Hn−1 and Hn, respectively, where n being a natural number;

A two-dimensional color space refers to the two-dimensional color space formed by lightness L axis and chroma C axis. Divide the color space formed by H axis, L axis and C axis having all the colors corresponding to source graphic data along the H axis into n two-dimensional color space formed by L axis and C axis. The color space having all the colors corresponding to source graphic data is a three-dimensional color space. After equal division along H axis, the three-dimensional space becomes n two-dimensional color spaces. The complicated color conversion problem is therefore simplified. An actual division method can be: dividing the three-dimensional space formed by H axis, L axis and C axis along the H axis in n equal parts to become n two-dimensional color spaces formed by L axis and C axis, where the hue value of each of n two-dimensional color spaces being H1, H2, H3, . . . , Hn−1 and Hn, respectively.

Figure 2:
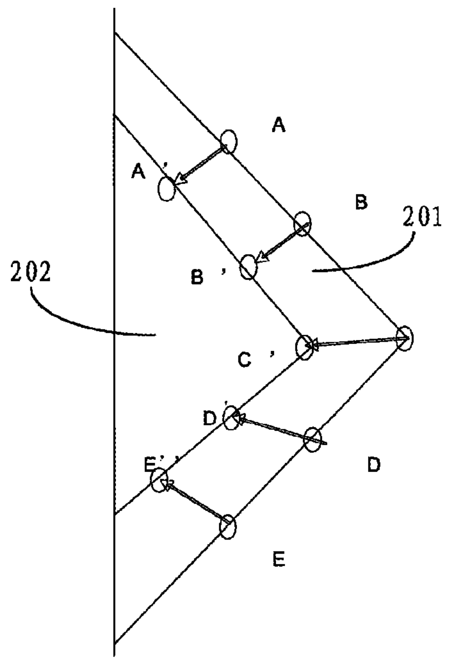
FIG. 2 is a schematic view showing color contents of source two-dimensional color space and target two-dimensional color space in an embodiment of color conversion method based on LCH color space according to the present invention.

As shown in FIG. 2, the three-dimensional LCH uniform color space having all the colors of source graphic data is divided into n equal parts along the H axis. The color contents of these n hue planes in the space SA of the source color are Hn 201. The lightness and color purity performance of the output color is adjusted according to the preference, and the new two-dimensional color contents Hn' 202 of target color space SB at the same hue level is generated. FIG. 2 shows the color contents of Hn 201 and Hn' 202 on the same hue plane.

Wherein, prior to step S102, the following step is executed: based on the positive proportional relation between the precision of color conversion and the number of the color space division, determining the number n to divide the color space having all colors corresponding to source graphic data into n two-dimensional color spaces having equal hue parts.

Step S103: defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where An', Bn', Cn', Dn', . . . , and An, Bn, Cn, Dn, having a first-type one-to-one mapping relation;

Saturation is a constructing factor of color. The saturation means the purity of the color. The higher the purity is, the more vivid the performance is. On the other hand, the lower the purity is, the less vivid the performance is. The most saturated status means the highest purity of the color.

The one-to-one mapping relation between the source graphic data two dimensional color space and the target two-dimensional color space is useful for finding the conversion relation between the source graphic data two dimensional color space and the target two-dimensional color space.

As shown in FIG. 2, the most saturated (i.e., having highest color purity) peripheral specific points A, B', C', D', . . . , on two-dimensional color contents Hn' 202, the most saturated peripheral specific points A, B, C, D, . . . , on two-dimensional color contents Hn 201 are adjusted for the lightness and color purity performance of the output color according to the preference to generate target color. As shown in FIG. 2, a one-to-one mapping relation exists between the most saturated peripheral specific points A, B, C, D, . . . , on two-dimensional color contents Hn 201 and the most saturated peripheral specific points A', B', C', D', . . . , on two-dimensional color contents Hn' 202.

Wherein, prior to step S103, the following step is executed: based on the positive proportional relation between the precision of color conversion and the number of the most saturated peripheral specific points of two-dimensional color space, determining the number of the most saturated peripheral specific points of two-dimensional color space.

Step S104: based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn';

A matrix is a two-dimensional data table arranged in rows and columns, and is a tool for solving linear equations. The first conversion matrix is the matrix satisfying a linear conversion relation between the two-dimensional color (C, L) of any most saturated peripheral specific point in two-dimensional color space Hn into the two-dimensional color (C', L') of corresponding most saturated peripheral specific point in target two-dimensional color space Hn'.

Based on the first-type one-to-one mapping relation between the most saturated peripheral specific points of two-dimensional color space Hn and the most saturated peripheral specific points of target two-dimensional color space Hn', the first conversion matrix is determined. Through this conversion matrix, the two-dimensional color (C, L) of any most saturated peripheral specific point in two-dimensional color space Hn can be converted into the two-dimensional color (C', L') of corresponding most saturated peripheral specific point in target two-dimensional color space Hn', which, in turn, can determine all the two-dimensional color (C', L') in target two-dimensional color space Hn'.

Step S105: based on the first-type one-to-one mapping relation, determining a second-type one-to-one mapping relation between the most saturated peripheral specific points An−1', Bn−1', Cn−1', Dn−1', . . . , in target two-dimensional color space Hn−1' and the most saturated peripheral specific points An−1, Bn−1, Cn−1, Dn−1, . . . , in two-dimensional color space Hn−1 having source graphic data; based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1';

A matrix is a two-dimensional data table arranged in rows and columns, and is a tool for solving linear equations. The second conversion matrix is the matrix satisfying a linear conversion relation between the two-dimensional color (C, L) of any most saturated peripheral specific point in two-dimensional color space Hn−1 into the two-dimensional color (C', L') of corresponding most saturated peripheral specific point in target two-dimensional color space Hn−1'.

Similarly, based on the second-type one-to-one mapping relation between the most saturated peripheral specific points of two-dimensional color space Hn−1 and the most saturated peripheral specific points of target two-dimensional color space Hn−1', the second conversion matrix is determined. Through this conversion matrix, the two-dimensional color (C, L) of any most saturated peripheral specific point in two-dimensional color space Hn−1 can be converted into the two-dimensional color (C', L') of corresponding most saturated peripheral specific point in target two-dimensional color space Hn−1', which, in turn, can determine all the two-dimensional color (C', L') in target two-dimensional color space Hn−1'.

In actual application, step S104 and step S105 can be executed in no particular order. In other words, Step S104 can be executed either before or after step S105.

Step S106: based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where Ax=($C_{Ax}$, $L_{Ax}$), Bx=($C_{Bx}$, $L_{Bx}$), Cx=($C_{Cx}$, $L_{Cx}$), Dx=($C_{Dx}$, $L_{Dx}$), . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where Ax'=($C_{Ax}$', $L_{Ax}$'), Bx'=($C_{Bx}$', $L_{Bx}$'), Cx'=($C_{Cx}$', $L_{Cx}$'), Dx'=($C_{Dx}$', $L_{Dx}$'), . . . ;

based on the two-dimensional color (C, L) of the most saturated peripheral specific points of two-dimensional color space Hn and the two-dimensional color (C, L) of the most saturated peripheral specific points of two-dimensional color space Hn−1, computing the two-dimensional color (C, L) of the most saturated peripheral specific points of two-dimensional color space Hx at any hue level between two-dimensional color space Hn and two-dimensional color space Hn−1; based on the two-dimensional color (C', L') of the most saturated peripheral specific points of two-dimensional color space Hn' and the two-dimensional color (C', L') of the most saturated peripheral specific points of two-dimensional color space Hn−1', computing the two-dimensional color (C', L') of the most saturated peripheral specific points of two-dimensional color space Hx' having the same hue level as two-dimensional color space Hx and between two-dimensional color space Hn' and two-dimensional color space Hn−1'.

Figure 3:
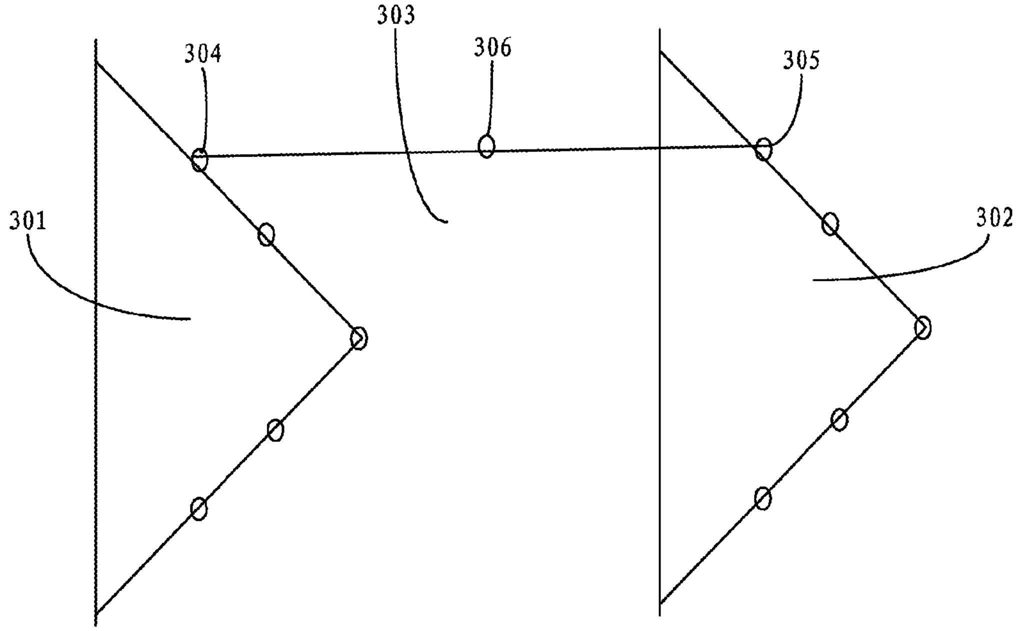
FIG. 3 is a schematic view showing the most saturated specific points in three source two-dimensional color spaces in an embodiment of color conversion method based on LCH color space according to the present invention.

As shown in FIG. 3, based on the most saturated peripheral specific points An, Bn, Cn, Dn, . . . , of two-dimensional color space Hn 301 and the most saturated peripheral specific points An−1, Bn−1, Cn−1, Dn−1, . . . , of two-dimensional color space Hn−1 302, the interpolation method is used to find the most saturated peripheral specific points Ax, Bx, Cx, Dx, . . . , of two-dimensional color space Hx 303 having the hue level between two-dimensional color space Hn 301 and two-dimensional color space Hn−1 302, where An ($C_n$, $L_n$) 304, An−1 ($C_{n-1}$, $L_{n-1}$) 305, Ax ($C_x$, $L_x$) 306 are three representative most saturated peripheral specific points in two-dimensional color space Hn 301, two-dimensional color space Hn−1 302 and two-dimensional color space Hx 303, respectively.

Figure 4:
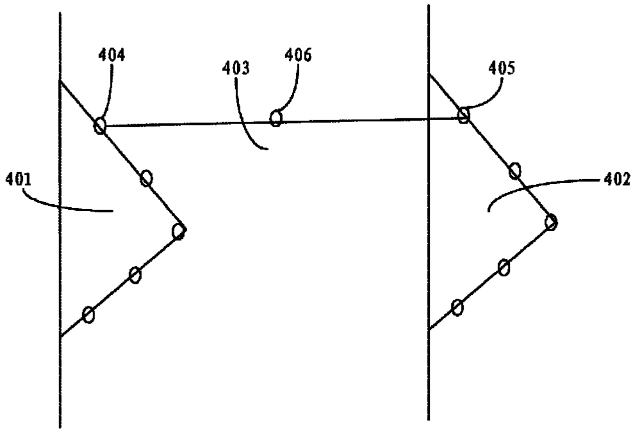
FIG. 4 is a schematic view showing the most saturated specific points in three target two-dimensional color spaces in an embodiment of color conversion method based on LCH color space according to the present invention.

FIG. 4 shows the color conversion between the two-dimensional color space Hn and two-dimensional color space Hn' for any two-dimensional color space Hn located at any hue level in the n equal-part hue spaces (H1, H2, H3, H4, . . . , Hn). Based on the most saturated peripheral specific points An', Bn', Cn', Dn', . . . , of two-dimensional color space Hn' 401 and the most saturated peripheral specific points An−1', Bn−1', Cn−1', Dn−1', . . . , of two-dimensional color space Hn−1' 402, the interpolation method is used to find the most saturated peripheral specific points Ax', Bx', Cx', Dx', . . . , of two-dimensional color space Hx' 403 having the hue level between two-dimensional color space Hn' 401 and two-dimensional color space Hn−1' 402, where An' ($C_n$', $L_n$') 404, An−1' ($C_{n-1}$', $L_{n-1}$') 405, Ax' ($C_x$', $L_x$') 406 are three representative most saturated peripheral specific points in two-dimensional color space Hn' 401, two-dimensional color space Hn−1' 402 and two-dimensional color space Hx' 403, respectively.

Step S107: based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color (C*, L*) in two-dimensional color space Hx and the two-dimensional color (C*', L*') in the target two-dimensional color space Hx';

A matrix is a two-dimensional data table arranged in rows and columns, and is a tool for solving linear equations. The third conversion matrix is the matrix satisfying a linear conversion relation between the two-dimensional color (C, L) of any most saturated peripheral specific point in two-dimensional color space Hx into the two-dimensional color (C', L') of corresponding most saturated peripheral specific point in target two-dimensional color space Hx'.

As shown in FIG. 3 and FIG. 4, based on the one-to-one mapping relation between the most saturated peripheral specific points Ax, Bx, Cx, Dx, . . . , of Hx 303 and the most saturated peripheral specific points Ax', Bx', Cx', Dx', . . . , of Hx' 403, the third conversion matrix is computed.

Step S108: through the third conversion matrix, computing the target color converted from the color of any point of source graphic data in the two-dimensional color space Hx;

Based on the third conversion matrix, the two-dimensional color (C, L) of any point in two-dimensional color space Hx can be converted the two-dimensional color (C', L') of a corresponding point in target two-dimensional color space Hx' corresponding to the said any point in two-dimensional color space Hx. In this manner, all the two-dimensional colors (C', L') in the target two-dimensional color space Hx' can be determined.

Step S109: outputting or preserving the bull's eye chart data corresponding to the target color after the above color conversion.

Figure 5:
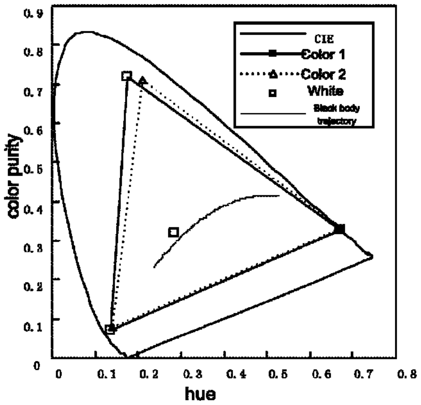
FIG. 5 is a schematic view showing a plot of two-dimensional hue and color purity in CIE 1931 color space.

FIG. 5 is a schematic view showing a plot of two-dimensional hue and color purity in CIE 1931 color space. As shown in FIG. 5, the RGB input signal of source graph has the color performance, such as chrome contents of "color 1", in CIE 1931 color space. After converting the R, G, B signals and based on the color preference, the source color can be converted from "color 1" into "color 2" to make the source green color appearing yellowish. Through the signal conversion, the hue of greenish color displayed on the monitor can be converted to the yellowish color to soften the overall image.

Figure 6:
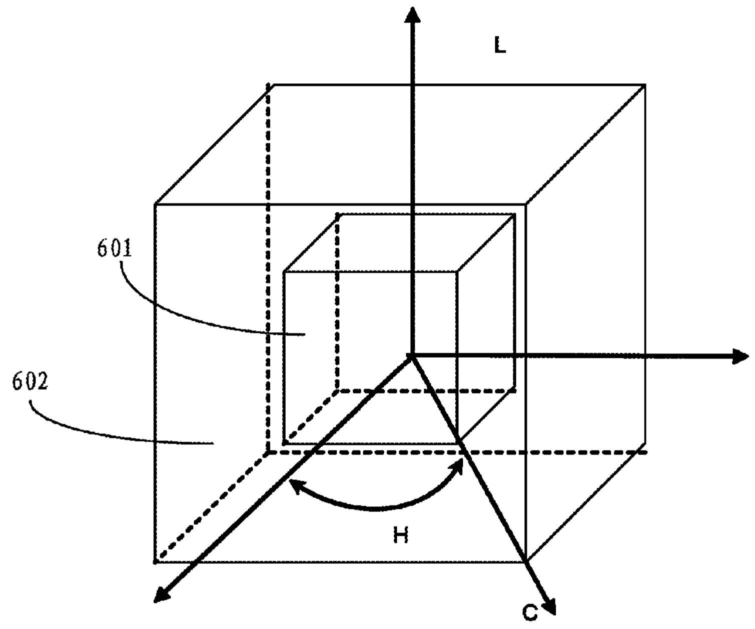
FIG. 6 is a schematic view showing a plot of three-dimensional hue and color purity in LCH color space according to the present invention.

FIG. 6 is a schematic view showing a plot of three-dimensional hue and color purity in LCH color space. As shown in FIG. 6, all the colors of source graphic data are inside a space SA 601 (SA 601 is not necessarily as the right cubic space formed by all colors depicted in FIG. 6. SA 601 can be any color space with curvy surface and content distribution.) Based on preference, the hue and color purity performance of the output color are adjusted so that all the colors of source graphic data can be converted to be inside a space SB 602 (SA 602 is not necessarily as the right cubic space formed by all colors. SA 602 can be any color space with curvy surface and content distribution.)

In a preferred embodiment of the present invention, the first conversion matrix is:

-continued $$\begin{bmatrix} C_{n^*} \\ L_{n^*} \end{bmatrix} = \begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_n^3 \\ L_n^3 \\ C_n^2 L_n \\ C_n L_n^2 \\ C_n^2 \\ L_n^2 \\ C_n L_n \\ C_n \\ L_n \\ 1 \end{bmatrix}$$

The first conversion matrix is the matrix satisfying a linear conversion relation between the two-dimensional color (C, L) of any most saturated peripheral specific point in two-dimensional color space Hn into the two-dimensional color (C', L') of corresponding most saturated peripheral specific point in target two-dimensional color space Hn'. In a preferred embodiment, the linear conversion relation between the two-dimensional color (C, L) of any most saturated peripheral specific point in two-dimensional color space Hn into the two-dimensional color (C', L') of corresponding most saturated peripheral specific point in target two-dimensional color space Hn' is a cubic polynomial function. In the first conversion matrix, the matrix on the left to the equal sign is the target matrix, the first matrix on the right to the equal sign is the coefficient matrix of the cubic polynomial function, and the second matrix on the right to the equal sign is the variable matrix of the cubic polynomial function.

In actual application, the linear conversion relation between the two-dimensional color (C, L) of any most saturated peripheral specific point in two-dimensional color space Hn into the two-dimensional color (C', L') of corresponding most saturated peripheral specific point in target two-dimensional color space Hn' can also be a polynomial function of higher orders, such as, quartic polynomial function, or quintic polynomial function. If the relation is a polynomial function of higher order, the number of rows of the coefficient matrix and the number of columns of the variable matrix must be adjusted accordingly.

The aforementioned second conversion matrix is:

$$\begin{bmatrix} C_{n-1^*} \\ L_{n-1^*} \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} C_{n-1}^3 \\ L_{n-1}^3 \\ C_{n-1}^2 L_{n-1} \\ C_{n-1} L_{n-1}^2 \\ C_{n-1}^2 \\ L_{n-1}^2 \\ C_{n-1} L_{n-1} \\ C_{n-1} \\ L_{n-1} \\ 1 \end{bmatrix}$$

The second conversion matrix is the matrix satisfying a linear conversion relation between the two-dimensional color (C, L) of any most saturated peripheral specific point in two-dimensional color space Hn−1 into the two-dimensional color (C', L') of corresponding most saturated peripheral specific point in target two-dimensional color space Hn−1'. In a preferred embodiment, the linear conversion relation between the two-dimensional color (C, L) of any most saturated peripheral specific point in two-dimensional color space Hn−1 into the two-dimensional color (C', L') of corresponding most saturated peripheral specific point in target two-dimensional color space Hn−1' is a cubic polynomial function. In the second conversion matrix, the matrix on the left to the equal sign is the target matrix, the first matrix on the right to the equal sign is the coefficient matrix of the cubic polynomial function, and the second matrix on the right to the equal sign is the variable matrix of the cubic polynomial function.

In actual application, the linear conversion relation between the two-dimensional color (C, L) of any most saturated peripheral specific point in two-dimensional color space Hn−1 into the two-dimensional color (C', L') of corresponding most saturated peripheral specific point in target two-dimensional color space Hn−1' can also be a polynomial function of higher orders, such as, quartic polynomial function, or quintic polynomial function. If the relation is a polynomial function of higher order, the number of rows of the coefficient matrix and the number of columns of the variable matrix must be adjusted accordingly.

The aforementioned the step of, based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where Ax=($C_{Ax}$, $L_{Ax}$), Bx=($C_{Bx}$, $L_{BX}$), Cx=($C_{Cx}$, $L_{Cx}$), Dx=($C_{Dx}$, $L_{Dx}$), . . . , further includes: based on the first equation among the most saturated peripheral specific points Ax, Bx, Cx, Dx, . . . , of two-dimensional color space Hx, the most saturated peripheral specific points An, Bn, Cn, Dn, . . . , of two-dimensional color space Hn and the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where the first equation being:

$$C_x=C_n+(H_x-H_n)*(C_{n-1}-C_n)/(H_{n-1}-H_n)$$

$$L_x=L_n+(H_x-H_n)*(L_{n-1}-L_n)/(H_{n-1}-H_n)$$

Based on the first relation equation, the two-dimensional color (C, L) of the most saturated peripheral specific points Ax, Bx, Cx, Dx, . . . , of two-dimensional color space Hx at any hue level between two-dimensional color space Hn and two-dimensional color space Hn−1 can be computed.

The aforementioned the step of, based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where Ax'=($C_{Ax}'$, $L_{Ax}'$), Bx'=($C_{Bx}'$, $L_{Bx}'$), Cx'=($C_{Cx}'$, $L_{Cx}'$), Dx'=($C_{Dx}'$, $L_{Dx}'$), . . . , further includes: based on the second equation among the most saturated peripheral specific points Ax', Bx', Cx', Dx', . . . , of two-dimensional color space Hx', the most saturated peripheral specific points An', Bn', Cn', Dn', . . . , of two-dimensional color space Hn' and the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where the second equation being:

$$C_x'=C_n'+(H_x'-H_n')*(C_{n-1}'-C_n')/(H_{n-1}'-H_n')$$

$$L_x'=L_n'+(H_x'-H_n')*(L_{n-1}-L_n')/(H_{n-1}'-H_n')$$

Based on the second relation equation, the two-dimensional color (C', L') of the most saturated peripheral specific points Ax', Bx', Cx', Dx', . . . , of two-dimensional color space Hx' at any hue level between two-dimensional color space Hn' and two-dimensional color space Hn−1' can be computed.

Wherein the computed third conversion matrix between the two-dimensional color (C*, L*) in two-dimensional color space Hx and the two-dimensional color (C*', L*') in the target two-dimensional color space Hx';

$$\begin{bmatrix} C_x' \\ L_x' \end{bmatrix} = \begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_x^3 \\ L_x^3 \\ C_x^2L_x \\ C_xL_x^2 \\ C_x^2 \\ L_x^2 \\ C_xL_x \\ C_x \\ L_x \\ 1 \end{bmatrix}$$

The third conversion matrix is the matrix satisfying a linear conversion relation between the two-dimensional color (C, L) of any most saturated peripheral specific point in two-dimensional color space Hx into the two-dimensional color (C', L') of corresponding most saturated peripheral specific point in target two-dimensional color space Hx'. In a preferred embodiment, the linear conversion relation between the two-dimensional color (C, L) of any most saturated peripheral specific point in two-dimensional color space Hx into the two-dimensional color (C', L') of corresponding most saturated peripheral specific point in target two-dimensional color space Hx' is a cubic polynomial function. In the third conversion matrix, the matrix on the left to the equal sign is the target matrix, the first matrix on the right to the equal sign is the coefficient matrix of the cubic polynomial function, and the second matrix on the right to the equal sign is the variable matrix of the cubic polynomial function.

In actual application, the linear conversion relation between the two-dimensional color (C, L) of any most saturated peripheral specific point in two-dimensional color space Hx into the two-dimensional color (C', L') of corresponding most saturated peripheral specific point in target two-dimensional color space Hx' can also be a polynomial function of higher orders, such as, quartic polynomial function, or quintic polynomial function. If the relation is a polynomial function of higher order, the number of rows of the coefficient matrix and the number of columns of the variable matrix must be adjusted accordingly.

After the step of, through the third conversion matrix, computing the target color converted from the color of any point of source graphic data in the two-dimensional color space Hx, the following step is executed: based on different preference, adjusting the hue of the target color for different hue; the adjustment equation is: $H'=H+\Delta f(H)$, where H being the source hue plane, H' being the adjusted hue performance according to preference, $\Delta f(H)$ representing the hue adjustment extent on the source hue plane.

The present invention is to be distinguished from the state of the art in the color conversion and liquid crystal display device technologies. The present invention converts source graphic data in two-dimensional color space Hn and two-dimensional color Hn−1 to target two-dimensional color space Hn' and two-dimensional color space Hn−1' through conversion matrix; uses two-dimensional color space Hn and two-dimensional color Hn−1 to compute a two-dimensional color space Hx between two-dimensional color space Hn and two-dimensional color Hn−1; uses two-dimensional color space Hn' and two-dimensional color Hn−1' to compute a two-dimensional color space Hx' between two-dimensional color space Hn' and two-dimensional color Hn−1' and at the same hue level as two-dimensional color space Hx; uses two-dimensional color space Hn and two-dimensional color Hn' to compute the conversion matrix between two-dimensional color space Hn and two-dimensional color Hn'; uses the conversion matrix between two-dimensional color space Hn and two-dimensional color Hn' to compute the target color converted from the color of any point of source graphic data and complete the color space of the target color. Through this manner, it is possible to perform color conversion on color signals in the LCH color space, adjust the color performance of the output color in hue and color purity, and enhance or accentuate any specific colors.

Figure 7:
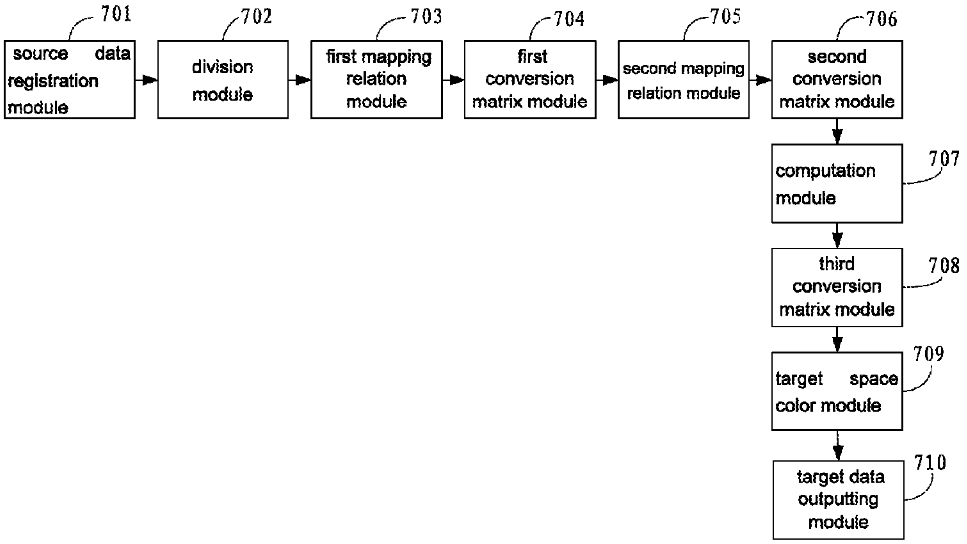
FIG. 7 is a schematic view of an embodiment of color conversional apparatus based on LCH color space according to the present invention.

FIG. 7 is a schematic view showing an embodiment of color conversion apparatus based on LCH color space according to the present invention. As shown in FIG. 7, the apparatus includes a source data registration module 701, a division module 702, a first mapping relation module 703, a first conversion matrix module 704, a second mapping relation module 705, a second conversion matrix module 706, a computation module 707, a third conversion matrix module 708, a target space color module 709, and a target data outputting module 710.

Source data registration module 701 is for inputting source graphic data based on LCH three-dimensional color space. LCH color space is derived from CIE LAB color space. LCH color space uses lightness L, chorma (saturation) C and hue H to describe color. The user can caliber the color from the lightness, chroma and hue of the color according to the visual psychology.

Division module 702 is for dividing the color space having all the colors corresponding to source graphic data into n two-dimensional color spaces, H1, H2, H3, . . . , Hn−1 and Hn, respectively, where n being a natural number.

A two-dimensional color space refers to the two-dimensional color space formed by lightness L axis and chroma C axis. Divide the color space formed by H axis, L axis and C axis having all the colors corresponding to source graphic data along the H axis into n two-dimensional color space formed by L axis and C axis. The color space having all the colors corresponding to source graphic data is a three-dimensional color space. After equal division along H axis, the three-dimensional space becomes n two-dimensional color spaces. The complicated color conversion problem is therefore simplified.

First mapping relation module 703 is for defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where the most saturated peripheral specific points An', Bn', Cn', Dn', . . . , of two-dimensional color space Hn' and the most saturated peripheral specific points An, Bn, Cn, Dn, . . . , of two-dimensional color space Hn having a first-type one-to-one mapping relation.

The one-to-one mapping relation between the source graphic data two dimensional color space and the target two-dimensional color space is useful for finding the conversion relation between the source graphic data two dimensional color space and the target two-dimensional color space.

First conversion matrix module 704 is for executing the following computation: based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', . . . , of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn'.

Based on the first-type one-to-one mapping relation between the most saturated peripheral specific points of two-dimensional color space Hn and the most saturated peripheral specific points of target two-dimensional color space Hn', the first conversion matrix is determined. Through this conversion matrix, the two-dimensional color (C, L) of any most saturated peripheral specific point in two-dimensional color space Hn can be converted into the two-dimensional color (C', L') of corresponding most saturated peripheral specific point in target two-dimensional color space Hn', which, in turn, can determine all the two-dimensional color (C', L') in target two-dimensional color space Hn'.

Second mapping relation module 705 is for executing the following computation: based on the first-type one-to-one mapping relation, determining a second-type one-to-one mapping relation between the most saturated peripheral specific points An−1', Bn−1', Cn−1', Dn−1', . . . ; in target two-dimensional color space Hn−1' and the most saturated peripheral specific points An−1, Bn−1, Cn−1, Dn−1, . . . , in two-dimensional color space Hn−1 having source graphic data.

Second conversion matrix module 706 is for executing the following computation: based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1'.

Similarly, based on the second-type one-to-one mapping relation between the most saturated peripheral specific points of two-dimensional color space Hn−1 and the most saturated peripheral specific points of target two-dimensional color space Hn−1', the second conversion matrix is determined. Through this conversion matrix, the two-dimensional color (C, L) of any most saturated peripheral specific point in two-dimensional color space Hn−1 can be converted into the two-dimensional color (C', L') of corresponding most saturated peripheral specific point in target two-dimensional color space Hn−1', which, in turn, can determine all the two-dimensional color (C', L') in target two-dimensional color space Hn−1'.

Computation module 707 is for executing the following computation: based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Hx at any hue level between two-dimensional color space Hn and two-dimensional color space Hn−1, where $Ax=(C_{Ax}, L_{Ax})$, $Bx=(C_{Bx}, L_{Bx})$, $Cx=(C_{Cx}, L_{Cx})$, $Dx=(C_{Dx}, L_{Dx})$, . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Hx' having the same hue level as two-dimensional color space Hx and between two-dimensional color space Hn' and two-dimensional color space Hn−1', where $Ax'=(C_{Ax}', L_{Ax}')$, $Bx'=(C_{Bx}', L_{Bx}')$, $Cx'=(C_{Cx}', L_{Cx}')$, $Dx'=(C_{Dx}', L_{Dx}')$, . . . .

Based on the two-dimensional color (C, L) of the most saturated peripheral specific points of two-dimensional color space Hn and the two-dimensional color (C, L) of the most saturated peripheral specific points of two-dimensional color space Hn−1, computing the two-dimensional color (C, L) of the most saturated peripheral specific points of two-dimensional color space Hx at any hue level between two-dimensional color space Hn and two-dimensional color space Hn−1; based on the two-dimensional color (C', L') of the most saturated peripheral specific points of two-dimensional color space Hn' and the two-dimensional color (C', L') of the most saturated peripheral specific points of two-dimensional color space Hn−1', computing the two-dimensional color (C', L') of the most saturated peripheral specific points of two-dimensional color space Hx' having the same hue level as two-dimensional color space Hx and between two-dimensional color space Hn' and two-dimensional color space Hn−1'.

Third conversion matrix module 708 is for executing the following computation: based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color ($C^*$, $L^*$) in two-dimensional color space Hx and the two-dimensional color ($C^{*\prime}$, $L^{*\prime}$) in the target two-dimensional color space Hx'.

Target space color module 709 is for executing the following computation: through the third conversion matrix, computing the target color converted from the color of any point of source graphic data in the two-dimensional color space Hx.

Based on the third conversion matrix, the two-dimensional color (C, L) of any point in two-dimensional color space Hx can be converted the two-dimensional color (C', L') of a corresponding point in target two-dimensional color space Hx' corresponding to the said any point in two-dimensional color space Hx. In this manner, all the two-dimensional colors (C', L') in the target two-dimensional color space Hx' can be determined.

Target data outputting module 710 is for outputting or preserving the bull's eye chart data corresponding to the target color after the above color conversion.

Wherein the apparatus further includes: a hue adjustment module, for executing the following computation: based on different preference, adjusting the hue of the target color for different hue; the adjustment equation is: $H'=H+\Delta f(H)$, where H being the source hue plane, H' being the adjusted hue performance according to preference, $\Delta f(H)$ representing the hue adjustment extent on the source hue plane.

Wherein the apparatus further includes a division number determination module, for executing the following computation: based on the positive proportional relation between the precision of color conversion and the number of the color space division, determining the number n to divide the color space having all colors corresponding to source graphic data into n two-dimensional color spaces having equal hue parts.

Wherein the apparatus further includes a specific point number determination module, for executing the following computation: based on the positive proportional relation between the precision of color conversion and the number of the most saturated peripheral specific points of two-dimensional color space, determining the number of the most saturated peripheral specific points of two-dimensional color space.

The present invention is to be distinguished from the state of the art in the color conversion and liquid crystal display device technologies. The present invention converts source graphic data in two-dimensional color space Hn and two-dimensional color Hn−1 to target two-dimensional color space Hn' and two-dimensional color space Hn−1' through conversion matrix; uses two-dimensional color space Hn and two-dimensional color Hn−1 to compute a two-dimensional color space Hx between two-dimensional color space Hn and two-dimensional color Hn−1; uses two-dimensional color space Hn' and two-dimensional color Hn−1' to compute a two-dimensional color space Hx' between two-dimensional color space Hn' and two-dimensional color Hn−1' and at the same hue level as two-dimensional color space Hx; uses two-dimensional color space Hn and two-dimensional color Hn' to compute the conversion matrix between two-dimensional color space Hn and two-dimensional color Hn'; uses the conversion matrix between two-dimensional color space Hn and two-dimensional color Hn' to compute the target color converted from the color of any point of source graphic data and complete the color space of the target color. Through this manner, it is possible to perform color conversion on color signals in the LCH color space, adjust the color performance of the output color in hue and color purity, and enhance or accentuate any specific colors.

Figure 8:
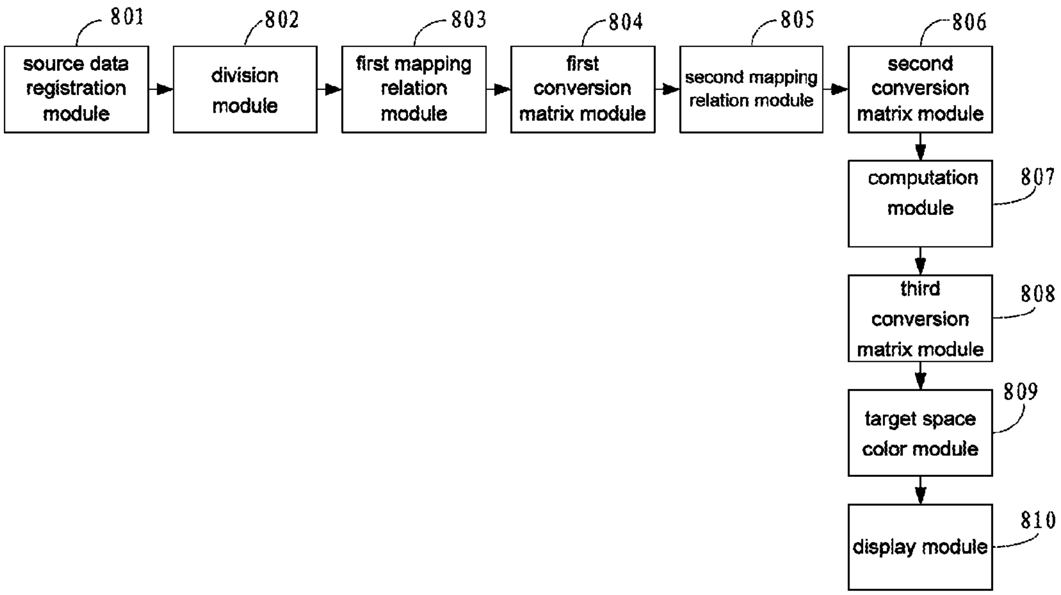
FIG. 8 is a schematic view showing an embodiment of liquid crystal display device according to the present invention.

FIG. 8 is a schematic view showing an embodiment of color conversion apparatus based on LCH color space according to the present invention. As shown in FIG. 8, the apparatus includes a source data registration module 801, a division module 802, a first mapping relation module 803, a first conversion matrix module 804, a second mapping relation module 805, a second conversion matrix module 806, a computation module 807, a third conversion matrix module 808, a target space color module 809, and a display module 810.

Source data registration module 801 is for inputting source graphic data based on LCH three-dimensional color space. LCH color space is derived from CIE LAB color space. LCH color space uses lightness L, chorma (saturation) C and hue H to describe color. The user can caliber the color from the lightness, chroma and hue of the color according to the visual psychology.

Division module 802 is for dividing the color space having all the colors corresponding to source graphic data into n two-dimensional color spaces, H1, H2, H3, . . . , Hn−1 and Hn, respectively, where n being a natural number.

First mapping relation module 803 is for defining the most saturated peripheral specific points of two-dimensional color space Hn having source graphic data as An, Bn, Cn, Dn, . . . , and defining the most saturated peripheral specific points of target two-dimensional color space Hn' with the same hue level as two-dimensional color space Hn having source graphic data as An', Bn', Cn', Dn', . . . , where the most saturated peripheral specific points An', Bn', Cn', Dn', . . . , of two-dimensional color space Hn' and the most saturated peripheral specific points An, Bn, Cn, Dn, . . . , of two-dimensional color space Hn having a first-type one-to-one mapping relation.

First conversion matrix module 804 is for executing the following computation: based on the first-type one-to-one mapping relation between the most saturated peripheral specific points An, Bn, Cn, Dn, . . . , of two-dimensional color space Hn having source graphic data, and the most saturated peripheral specific points An', Bn', Cn', Dn', . . . , of target two-dimensional color space Hn', determining a first conversion matrix; based on the first conversion matrix, converting the two-dimensional color (C, L) of any most saturated peripheral specific point in two-dimensional color space Hn into the two-dimensional color (C', L') of corresponding most saturated peripheral specific point in target two-dimensional color space Hn'.

Second mapping relation module 805 is for executing the following computation: based on the first-type one-to-one mapping relation, determining a second-type one-to-one mapping relation between the most saturated peripheral specific points An−1', Bn−1', Cn−1', Dn−1', . . . , in target two-dimensional color space Hn−1' and the most saturated peripheral specific points An−1, Bn−1, Cn−1, Dn−1, . . . , in two-dimensional color space Hn−1 having source graphic data.

Second conversion matrix module 806 is for executing the following computation: based on the second-type mapping relation, determining a second conversion matrix; based on the second conversion matrix, converting the two-dimensional color (C, L) of any most saturated peripheral specific point in two-dimensional color space Hn−1 into the two-dimensional color (C', L') of corresponding most saturated peripheral specific point in target two-dimensional color space Hn−1'.

Computation module 807 is for executing the following computation: based on the two-dimensional color (C, L) of the most saturated peripheral specific points An, Bn, Cn, Dn, . . . , of two-dimensional color space Hn and the two-dimensional color (C, L) of the most saturated peripheral specific points An−1, Bn−1, Cn−1, Dn−1, . . . , of two-dimensional color space Hn−1, computing the two-dimensional color (C, L) of the most saturated peripheral specific points Ax, Bx, Cx, Dx, . . . , of two-dimensional color space Fix at any hue level between two-dimensional color space Fin and two-dimensional color space Hn−1, where $Ax=(C_{Ax}, L_{Ax})$, $Bx=(C_{Bx}, L_{Bx})$, $Cx=(C_{Cx}, L_{Cx})$, $Dx=(C_{Dx}, L_{Dx})$, . . . ; based on the two-dimensional color (C', L') of the most saturated peripheral specific points An', Bn', Cn', Dn', . . . , of two-dimensional color space Hn' and the two-dimensional color (C', L') of the most saturated peripheral specific points An−1', Bn−1', Cn−1', Dn−1', . . . , of two-dimensional color space Hn−1', computing the two-dimensional color (C', L') of the most saturated peripheral specific points Ax', Bx', Cx', Dx', . . . , of two-dimensional color space Fix' having the same hue level as two-dimensional color space Hx and between two-dimensional color space Hn' and two-dimensional color space Hn−1', where $Ax'=(C_{Ax}', L_{Ax}')$, $Bx'=(C_{Bx}', L_{Bx}')$, $Cx'=(C_{Cx}', L_{Cx}')$, $Dx'=(C_{Dx}', L_{Dx}')$, . . . .

Third conversion matrix module 808 is for executing the following computation: based on the most saturated peripheral specific points Ax', Bx', Cx', Dx', . . . , of two-dimensional color space Hx' and the most saturated peripheral specific points Ax, Bx, Cx, Dx, . . . , of two-dimensional color space Hx, computing a third conversion matrix between the two-dimensional color (C*, L*) in two-dimensional color space Hx and the two-dimensional color (C*', L*') in the target two-dimensional color space Hx'.

Target space color module 809 is for executing the following computation: through the third conversion matrix, computing the target color converted from the color of any point of source graphic data in the two-dimensional color space Hx.

Display module 810 is for displaying the bull's eye chart data corresponding to t the target color after the above color conversion Wherein the apparatus further includes: a hue adjustment module, for executing the following computation: based on different preference, adjusting the hue of the target color for different hue; the adjustment equation is: $H'=H+\Delta f(H)$, where H being the source hue plane, H' being the adjusted hue performance according to preference, $\Delta f(H)$ representing the hue adjustment extent on the source hue plane.

Wherein the apparatus further includes a division number determination module, for executing the following computation: based on the positive proportional relation between the precision of color conversion and the number of the color space division, determining the number n to divide the color space having all colors corresponding to source graphic data into n two-dimensional color spaces having equal hue parts.

Wherein the apparatus further includes a specific point number determination module, for executing the following computation: based on the positive proportional relation between the precision of color conversion and the number of the most saturated peripheral specific points of two-dimensional color space, determining the number of the most saturated peripheral specific points of two-dimensional color space.

The present invention is to be distinguished from the state of the art in the color conversion and liquid crystal display device technologies. The present invention converts source graphic data in two-dimensional color space Hn and two-dimensional color Hn−1 to target two-dimensional color space Hn' and two-dimensional color space Hn−1' through conversion matrix; uses two-dimensional color space Hn and two-dimensional color Hn−1 to compute a two-dimensional color space Hx between two-dimensional color space Hn and two-dimensional color Hn−1; uses two-dimensional color space Hn' and two-dimensional color Hn−1' to compute a two-dimensional color space Hx' between two-dimensional color space Hn' and two-dimensional color Hn−1' and at the same hue level as two-dimensional color space Hx; uses two-dimensional color space Hn and two-dimensional color Hn' to compute the conversion matrix between two-dimensional color space Hn and two-dimensional color Hn'; uses the conversion matrix between two-dimensional color space Hn and two-dimensional color Hn' to compute the target color converted from the color of any point of source graphic data and complete the color space of the target color. Through this manner, it is possible to perform color conversion on color signals in the LCH color space, adjust the color performance of the output color in hue and color purity, and enhance or accentuate any specific colors.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A color conversion method based on LCH color space, comprising the steps of:

inputting source graphic data based on LCH three-dimensional color space;

dividing color space having all colors corresponding to said source graphic data into n two-dimensional color spaces, H1, H2, H3, . . . , Hn−1 and Hn, respectively, where n being a natural number;

defining most saturated peripheral specific points of two-dimensional color space Hn having said source graphic data as An, Bn, Cn, Dn, . . . , and defining most saturated peripheral specific points of target two-dimensional color space Hn' at same hue level as two-dimensional color space Hn having said source graphic data as An', Bn', Cn', Dn', . . . , where An', Bn', Cn', Dn', . . . , and An, Bn, Cn, Dn, . . . having a first-type one-to-one mapping relation;

based on said first-type one-to-one mapping relation between said most saturated peripheral specific points An, Bn, Cn, Dn, . . . , of two-dimensional color space Hn having said source graphic data, and said most saturated peripheral specific points An', Bn', Cn', Dn', . . . , of target two-dimensional color space Hn', determining a first conversion matrix; based on said first conversion matrix, converting two-dimensional color (C, L) of any most saturated peripheral specific point in two-dimensional color space Hn into two-dimensional color (C', L') of corresponding most saturated peripheral specific point in target two-dimensional color space Hn';

based on said first-type one-to-one mapping relation, determining a second-type one-to-one mapping relation between most saturated peripheral specific points An−1', Bn−1', Cn−1', Dn−1', . . . , in target two-dimensional color space Hn−1' and most saturated peripheral specific points An−1, Bn−1, Cn−1, Dn−1, . . . , in two-dimensional color space Hn−1 having said source graphic data; based on said second-type mapping relation, determining a second conversion matrix; based on said second conversion matrix, converting two-dimensional color (C, L) of any most saturated peripheral specific point in two-dimensional color space Hn−1 into two-dimensional color (C', L') of corresponding most saturated peripheral specific point in target two-dimensional color space Hn−1';

based on said two-dimensional color (C, L) of said most saturated peripheral specific points An, Bn, Cn, Dn, . . . , of two-dimensional color space Hn and said two-dimensional color (C, L) of said most saturated peripheral specific points An−1, Bn−1, Cn−1, Dn−1, . . . , of two-dimensional color space Hn−1, computing two-dimensional color (C, L) of most saturated peripheral specific points Ax, Bx, Cx, Dx, . . . , of two-dimensional color space Hx at any hue level between two-dimensional color space Hn and two-dimensional color space Hn−1, where Ax=($C_{Ax}$, $L_{Ax}$), Bx=($C_{Bx}$, $L_{BX}$), Cx=($C_{Cx}$, $L_{Cx}$), Dx=($C_{Dx}$, $L_{Dx}$), . . . ; based on said two-dimensional color (C', L') of said most saturated peripheral specific points An', Bn', Cn', Dn', . . . , of two-dimensional color space Hn' and said two-dimensional color (C', L') of said most saturated peripheral specific points An−1', Bn−1', Cn−1', Dn−1', . . . , of two-dimensional color space Hn−1', computing two-dimensional color (C', L') of most saturated peripheral specific points Ax', Bx', Cx', Dx', . . . , of two-dimensional color space Hx', having same hue level as two-dimensional color space Hx and between two-dimensional color space Hn' and two-dimensional color space Hn−1', where Ax'=($C_{Ax}$', $L_{Ax}$'), Bx'=($C_{Bx}$', $L_{Bx}$'), Cx'=($C_{Cx}$', $L_{Cx}$'), Dx'=($C_{Dx}$', $L_{Dx}$'), . . . ;

based on said most saturated peripheral specific points Ax', Bx', Cx', Dx', . . . , of two-dimensional color space Hx' and said most saturated peripheral specific points Ax, Bx, Cx, Dx, . . . , of two-dimensional color space Hx, computing a third conversion matrix between two-dimensional color (C*, L*) in two-dimensional color space Hx and two-dimensional color (C*', L*') in the target two-dimensional color space Hx';

through said third conversion matrix, computing target color converted from color of any point of said source graphic data in two-dimensional color space Hx; and outputting or preserving bull's eye chart data corresponding to said target color after above said color conversion.

2. The method as claimed in claim 1, wherein said first conversion matrix is:

$$\begin{bmatrix} C_{n^*} \\ L_{n^*} \end{bmatrix} = \begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_n^3 \\ L_n^3 \\ C_n^2 L_n \\ C_n L_n^2 \\ C_n^2 \\ L_n^2 \\ C_n L_n \\ C_n \\ L_n \\ 1 \end{bmatrix}.$$

3. The method as claimed in claim 1, wherein said second conversion matrix is:

$$\begin{bmatrix} C_{n-1^*} \\ L_{n-1^*} \end{bmatrix} =$$

-continued $$\begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} C_{n-1}^3 \\ L_{n-1}^3 \\ C_{n-1}^2 L_{n-1} \\ C_{n-1} L_{n-1}^2 \\ C_{n-1}^2 \\ L_{n-1}^2 \\ C_{n-1} L_{n-1} \\ C_{n-1} \\ L_{n-1} \\ 1 \end{bmatrix}.$$

4. The method as claimed in claim 1, wherein said step of computing two-dimensional color (C, L) of most saturated peripheral specific points Ax, Bx, Cx, Dx, . . . , of two-dimensional color space Hx at any hue level between two-dimensional color space Hn and two-dimensional color space Hn−1, based on said two-dimensional color (C, L) of said most saturated peripheral specific points An, Bn, Cn, Dn, . . . , of two-dimensional color space Hn and said two-dimensional color (C, L) of said most saturated peripheral specific points An−1, Bn−1, Cn−1, Dn−1, . . . , of two-dimensional color space Hn−1, where Ax=($C_{Ax}$, $L_{Ax}$), Bx=($C_{Bx}$, $L_{Bx}$), Cx=($C_{Cx}$, $L_{Cx}$), Dx=($C_{Dx}$, $L_{Dx}$), . . . , further comprises: based on first equation among said most saturated peripheral specific points Ax, Bx, Cx, Dx, . . . , of two-dimensional color space Hx, said most saturated peripheral specific points An, Bn, Cn, Dn, . . . , of two-dimensional color space Hn and said most saturated peripheral specific points An−1, Bn−1, Cn−1, Dn−1, . . . , of two-dimensional color space Hn−1, computing said two-dimensional color (C, L) of said most saturated peripheral specific points Ax, Bx, Cx, Dx, . . . , of two-dimensional color space Hx at any hue level between two-dimensional color space Hn and two-dimensional color space Hn−1, where said first equation being:

$$C_x = C_n + (H_x - H_n) * (C_{n-1} - C_n)/(H_{n-1} - H_n)$$

$$L_x = L_n + (H_x - H_n) * (L_{n-1} - L_n)/(H_{n-1} - H_n).$$

5. The method as claimed in claim 1, wherein said step of computing two-dimensional color (C', L') of most saturated peripheral specific points Ax', Bx', Cx', Dx', . . . , of two-dimensional color space Hx' having same hue level as two-dimensional color space Hx and between two-dimensional color space Hn' and two-dimensional color space Hn−1', based on said two-dimensional color (C', L') of said most saturated peripheral specific points An', Bn', Cn', Dn', . . . , of two-dimensional color space Hn' and said two-dimensional color (C', L') of said most saturated peripheral specific points An−1', Bn−1', Cn−1', Dn−1', . . . , of two-dimensional color space Hn−1', where Ax'=($C_{Ax}'$, $L_{Ax}'$), Bx'=($C_{Bx}'$, $L_{Bx}'$), Cx'=($C_{Cx}'$, $L_{Cx}'$), Dx'=($C_{Dx}'$, $L_{Dx}'$), . . . , further comprises: based on second equation among said most saturated peripheral specific points Ax', Bx', Cx', Dx', . . . , of two-dimensional color space Hx', said most saturated peripheral specific points An', Bn', Cn', Dn', . . . , of two-dimensional color space Hn' and said most saturated peripheral specific points An−1', Bn−1', Cn−1', Dn−1', . . . , of two-dimensional color space Hn−1', computing two-dimensional color (C', L') of said most saturated peripheral specific points Ax', Bx', Cx', Dx', . . . , of two-dimensional color space Hx' having same hue level as two-dimensional color space Hx and between two-dimensional color space Hn' and two-dimensional color space Hn−1', where said second equation being:

$$C_x' = C_n' + (H_x' - H_n') * (C_{n-1}' - C_n')/(H_{n-1}' - H_n')$$

$$L_x' = L_n' + (H_x' - H_n') * (L_{n-1} - L_n')/(H_{n-1}' - H_n').$$

6. The method as claimed in claim 1, wherein said computed third conversion matrix between two-dimensional color (C*, L*) in two-dimensional color space Hx and two-dimensional color (C*', L*') in target two-dimensional color space Hx' is:

$$\begin{bmatrix} C_x' \\ L_x' \end{bmatrix} = \begin{bmatrix} C11 & C12 & C13 & C14 & C15 & C16 & C17 & C18 & C19 & C20 \\ C21 & C22 & C23 & C24 & C25 & C26 & C27 & C28 & C29 & C30 \end{bmatrix} \times \begin{bmatrix} C_x^3 \\ L_x^3 \\ C_x^2 L_x \\ C_x L_x^2 \\ C_x^2 \\ L_x^2 \\ C_x L_x \\ C_x \\ L_x \\ 1 \end{bmatrix}.$$

7. The method as claimed in claim 1, wherein after said step of, through said third conversion matrix, computing target color converted from color of any point of said source graphic data in two-dimensional color space Hx, further comprises: based on different preference, adjusting hue of said target color for different hue; adjustment equation is: H'=H+Δf(H), where H being source hue plane, H' being adjusted hue performance according to preference, Δf(H) representing hue adjustment extent on said source hue plane.

8. The method as claimed in claim 1, wherein before said step of: dividing color space having all colors corresponding to said source graphic data into n two-dimensional color spaces, further comprises: based on positive proportional relation between precision of color conversion and number of color space division, determining a number n to divide said color space having all colors corresponding to said source graphic data into n two-dimensional color spaces having equal hue parts.

9. The method as claimed in claim 1, wherein before said step of: defining most saturated peripheral specific points of two-dimensional color space Hn having said source graphic data as An, Bn, Cn, Dn, . . . , and defining most saturated peripheral specific points of target two-dimensional color space Hn' with same hue level as two-dimensional color space Hn having said source graphic data as An', Bn', Cn', Dn', . . . , further comprises: based on positive proportional relation between precision of color conversion and number of most saturated peripheral specific points of two-dimensional color space, determining said number of most saturated peripheral specific points of two-dimensional color space.

10. A color conversion apparatus based on LCH color space, comprising:

a source data registration module, for inputting source graphic data based on LCH three-dimensional color space;

a division module, for dividing color space having all colors corresponding to said source graphic data into n two-dimensional color spaces, H1, H3, . . . , Hn−1 and Hn, respectively, where n being a natural number;

a first mapping relation module, for defining most saturated peripheral specific points of two-dimensional color space Hn having said source graphic data as An, Bn, Cn, Dn, . . . , and defining most saturated peripheral specific points of target two-dimensional color space Hn' at same hue level as two-dimensional color space Hn having said source graphic data as An', Bn', Cn', Dn', . . . , where An', Bn', Cn', Dn', . . . , and An, Bn, Cn, Dn, . . . having a first-type one-to-one mapping relation;

a first conversion matrix module, for executing the following computation: based on said first-type one-to-one mapping relation between said most saturated peripheral specific points An, Bn, Cn, Dn, . . . , of two-dimensional color space Hn having said source graphic data, and said most saturated peripheral specific points An', Bn', Cn', Dn', . . . , of target two-dimensional color space Hn', determining a first conversion matrix; based on said first conversion matrix, converting two-dimensional color (C, L) of any most saturated peripheral specific point in two-dimensional color space Hn into two-dimensional color (C', L') of corresponding most saturated peripheral specific point in target two-dimensional color space Hn';

a second mapping relation module, for executing the following computation: based on said first-type one-to-one mapping relation, determining a second-type one-to-one mapping relation between most saturated peripheral specific points An−1', Bn−1', Cn−1', Dn−1', . . . , in target two-dimensional color space Hn−1' and most saturated peripheral specific points An−1, Bn−1, Cn−1, Dn−1, . . . , in two-dimensional color space Hn−1 having said source graphic data;

a second conversion matrix module, for executing the following computation: based on said second-type mapping relation, determining a second conversion matrix; based on said second conversion matrix, converting two-dimensional color (C, L) of any most saturated peripheral specific point in two-dimensional color space Hn−1 into two-dimensional color (C', L') of corresponding most saturated peripheral specific point in target two-dimensional color space Hn−1';

a computation module, for executing the following computation: based on said two-dimensional color (C, L) of said most saturated peripheral specific points An, Bn, Cn, Dn, . . . , of two-dimensional color space Hn and said two-dimensional color (C, L) of said most saturated peripheral specific points An−1, Bn−1, Cn−1, Dn−1, . . . , of two-dimensional color space Hn−1, computing two-dimensional color (C, L) of most saturated peripheral specific points Ax, Bx, Cx, Dx, of two-dimensional color space Hx at any hue level between two-dimensional color space Hn and two-dimensional color space Hn−1, where $Ax=(C_{Ax}, L_{Ax})$, $Bx=(C_{Bx}, L_{Bx})$, $Cx=(C_{Cx}, L_{Cx})$, $Dx=(C_{Dx}, L_{Dx})$, . . . ; based on said two-dimensional color (C', L') of said most saturated peripheral specific points An', Bn', Cn', Dn', . . . , of two-dimensional color space Hn' and said two-dimensional color (C', L') of said most saturated peripheral specific points An−1', Bn−1', Cn−1', Dn−1', . . . , of two-dimensional color space Hn−1', computing two-dimensional color (C', L') of most saturated peripheral specific points Ax', Bx', Cx', Dx', . . . , of two-dimensional color space Hx' having same hue level as two-dimensional color space Hx and between two-dimensional color space Hn' and two-dimensional color space Hn−1', where $Ax'=(C_{Ax}', L_{Ax}')$, $Bx'=(C_{Bx}', L_{Bx}')$, $Cx'=(C_{Cx}', L_{Cx}')$, $Dx'=(C_{Dx}', L_{Dx}')$, . . . ;

a third conversion matrix module, for executing the following computation: based on said most saturated peripheral specific points Ax', Bx', Cx', Dx', . . . , of two-dimensional color space Hx' and said most saturated peripheral specific points Ax, Bx, Cx, Dx, . . . , of two-dimensional color space Hx, computing a third conversion matrix between two-dimensional color ($C^*$, $L^*$) in two-dimensional color space Hx and two-dimensional color ($C^{*\prime}$, $L^{*\prime}$) in the target two-dimensional color space Hx';

a target space color module, for executing the following computation: through said third conversion matrix, computing target color converted from color of any point of said source graphic data in two-dimensional color space Hx; and a target data outputting module, for outputting or preserving bull's eye chart data corresponding to said target color after above said color conversion.

11. The apparatus as claimed in claim 10, further comprising:

a hue adjustment module, for executing the following computation: based on different preference, adjusting hue of said target color for different hue; adjustment equation is: $H'=H+\Delta f(H)$, where H being source hue plane, H' being adjusted hue performance according to preference, $\Delta f(H)$ representing hue adjustment extent on said source hue plane.

12. The apparatus as claimed in claim 10, further comprising:

a division number determination module, for executing the following computation: based on positive proportional relation between precision of color conversion and number of color space division, determining a number n to divide said color space having all colors corresponding to said source graphic data into n two-dimensional color spaces having equal hue parts.

13. The apparatus as claimed in claim 10, further comprising:

a specific point number determination module, for executing the following computation: based on positive proportional relation between precision of color conversion and number of most saturated peripheral specific points of two-dimensional color space, determining said number of most saturated peripheral specific points of two-dimensional color space.

14. A liquid crystal display device, comprising:

a source data registration module, for inputting source graphic data based on LCH three-dimensional color space;

a division module, for dividing color space having all colors corresponding to said source graphic data into n two-dimensional color spaces, H1, H2, H3, . . . , Hn−1 and Hn, respectively, where n being a natural number;

a first mapping relation module, for defining most saturated peripheral specific points of two-dimensional color space Hn having said source graphic data as An, Bn, Cn, Dn, . . . , and defining most saturated peripheral specific points of target two-dimensional color space Hn' at same hue level as two-dimensional color space Hn having said source graphic data as An', Bn', Cn', Dn', . . . , where An', Bn', Cn', Dn', . . . , and An, Bn, Cn, Dn, . . . having a first-type one-to-one mapping relation;

a first conversion matrix module, for executing the following computation: based on said first-type one-to-one mapping relation between said most saturated peripheral specific points An, Bn, Cn, Dn, . . . , of two-dimensional color space Hn having said source graphic data, and said most saturated peripheral specific points An', Bn', Cn', Dn', . . . , of target two-dimensional color space Hn', determining a first conversion matrix; based on said first conversion matrix, converting two-dimensional color (C, L) of any most saturated peripheral specific point in two-dimensional color space Hn into two-dimensional color (C', L') of corresponding most saturated peripheral specific point in target two-dimensional color space Hn';

a second mapping relation module, for executing the following computation: based on said first-type one-to-one mapping relation, determining a second-type one-to-one mapping relation between most saturated peripheral specific points An−1', Bn−1', Cn−1', Dn−1', . . . , in target two-dimensional color space Hn−1' and most saturated peripheral specific points An−1, Bn−1, Cn−1, Dn−1, . . . , in two-dimensional color space Hn−1 having said source graphic data;

a second conversion matrix module, for executing the following computation: based on said second-type mapping relation, determining a second conversion matrix; based on said second conversion matrix, converting two-dimensional color (C, L) of any most saturated peripheral specific point in two-dimensional color space Hn−1 into two-dimensional color (C', L') of corresponding most saturated peripheral specific point in target two-dimensional color space Hn−1';

a computation module, for executing the following computation: based on said two-dimensional color (C, L) of said most saturated peripheral specific points An, Bn, Cn, Dn, . . . , of two-dimensional color space Hn and said two-dimensional color (C, L) of said most saturated peripheral specific points An−1, Bn−1, Cn−1, Dn−1, . . . , of two-dimensional color space Hn−1, computing two-dimensional color (C, L) of most saturated peripheral specific points Ax, Bx, Cx, Dx, of two-dimensional color space Hx at any hue level between two-dimensional color space Hn and two-dimensional color space Hn−1, where Ax=($C_{Ax}$, $L_{Ax}$), Bx=($C_{Bx}$, $L_{Bx}$), Cx=($C_{Cx}$, $L_{Cx}$), Dx=($C_{Dx}$, $L_{Dx}$), . . . ; based on said two-dimensional color (C', L') of said most saturated peripheral specific points An', Bn', Cn', Dn', . . . , of two-dimensional color space Hn' and said two-dimensional color (C', L') of said most saturated peripheral specific points An−1', Bn−1', Cn−1', Dn−1', . . . , of two-dimensional color space Hn−1', computing two-dimensional color (C', L') of most saturated peripheral specific points Ax', Bx', Cx', Dx', . . . , of two-dimensional color space Hx' having same hue level as two-dimensional color space Hx and between two-dimensional color space Hn' and two-dimensional color space Hn−1', where Ax'=($C_{Ax}'$, $L_{Ax}'$), Bx'=($C_{Bx}'$, $L_{Bx}'$), Cx'=($C_{Cx}'$, $L_{Cx}'$), Dx'=($C_{Dx}'$, $L_{Dx}'$), . . . ;

a third conversion matrix module, for executing the following computation: based on said most saturated peripheral specific points Ax', Bx', Cx', Dx', . . . , of two-dimensional color space Hx' and said most saturated peripheral specific points Ax, Bx, Cx, Dx, . . . , of two-dimensional color space Hx, computing a third conversion matrix between two-dimensional color (C*, L*) in two-dimensional color space Hx and two-dimensional color (C*', L*') in the target two-dimensional color space Hx';

a target space color module, for executing the following computation: through said third conversion matrix, computing target color converted from color of any point of said source graphic data in two-dimensional color space Hx; and a display module, for displaying bull's eye chart data corresponding to said target color after above said color conversion.

15. The liquid crystal display as claimed in claim 14, further comprising:

a hue adjustment module, for executing the following computation: based on different preference, adjusting hue of said target color for different hue; adjustment equation is: $H'=H+\Delta f(H)$, where H being source hue plane, H' being adjusted hue performance according to preference, $\Delta f(H)$ representing hue adjustment extent on said source hue plane.

16. The liquid crystal display as claimed in claim 14, further comprising:

a division number determination module, for executing the following computation: based on positive proportional relation between precision of color conversion and number of color space division, determining a number n to divide said color space having all colors corresponding to said source graphic data into n two-dimensional color spaces having equal hue parts.

17. The liquid crystal display as claimed in claim 14, further comprising:

a specific point number determination module, for executing the following computation: based on positive proportional relation between precision of color conversion and number of most saturated peripheral specific points of two-dimensional color space, determining said number of most saturated peripheral specific points of two-dimensional color space.

* * * * *